United States Patent
Harada et al.

(10) Patent No.: US 10,217,368 B2
(45) Date of Patent: Feb. 26, 2019

(54) FLIGHT PATH SETTING APPARATUS, FLIGHT PATH SETTING METHOD, AND COMPUTER READABLE MEDIUM

(71) Applicant: SUBARU CORPORATION, Tokyo (JP)

(72) Inventors: Shinichi Harada, Tokyo (JP); Satoshi Kuroyanagi, Tokyo (JP); Yukinobu Tomonaga, Tokyo (JP)

(73) Assignee: Subaru Corporation, Tokyo (JP)

( * ) Notice: Subject to any disclaimer, the term of this patent is extended or adjusted under 35 U.S.C. 154(b) by 71 days.

(21) Appl. No.: 15/622,945

(22) Filed: Jun. 14, 2017

(65) Prior Publication Data

US 2018/0017975 A1 Jan. 18, 2018

(30) Foreign Application Priority Data

Jul. 15, 2016 (JP) .................................. 2016-139964

(51) Int. Cl.
*G08G 5/00* (2006.01)
*G01C 23/00* (2006.01)
(Continued)

(52) U.S. Cl.
CPC ......... *G08G 5/0039* (2013.01); *B64C 39/024* (2013.01); *G01C 21/20* (2013.01);
(Continued)

(58) Field of Classification Search
CPC ............................ G08G 5/0039; G08G 5/0034
See application file for complete search history.

(56) References Cited

U.S. PATENT DOCUMENTS 5,340,061 A * 8/1994 Vaquier ................ G08G 5/0021
244/175
9,134,130 B1 * 9/2015 Schneider ............ G05D 1/0088
(Continued)

FOREIGN PATENT DOCUMENTS

| EP | 2031350 A1 | 3/2009 |
| JP | 3557445 B2 | 8/2004 |
| JP | 2014-016264 A | 1/2014 |

OTHER PUBLICATIONS

Office Action issued in corresponding Japanese Patent Application No. 2016-139964, dated Mar. 6, 2018.
(Continued)

*Primary Examiner* — Jelani A Smith
*Assistant Examiner* — Kelly D Williams
(74) *Attorney, Agent, or Firm* — McDermott Will & Emery LLP (57) ABSTRACT

A flight path setting apparatus includes a display unit, a selector, a range calculator, and a display controller. The display unit displays a flight path of an aircraft. The flight path includes a plurality of points. The selector selects a first point on the basis of an operation performed by a user. The first point is any one of the points displayed by the display unit. The range calculator calculates a non-settable range on the basis of a flight performance and a surrounding environment of the aircraft. The non-settable range is a region that is around the first point and in which a second point is not settable. The second point is subsequent to the first point on the flight path. The display controller causes the display unit to display the non-settable range that relates to the first point and is calculated by the range calculator.

7 Claims, 4 Drawing Sheets

(51) Int. Cl.
*G01C 21/20* (2006.01)
*B64C 39/02* (2006.01)
*G05D 1/04* (2006.01)
*G05D 1/06* (2006.01)
*G05D 1/08* (2006.01)
*G05D 1/00* (2006.01)

(52) U.S. Cl.
CPC ......... *G08G 5/0017* (2013.01); *G08G 5/0021* (2013.01); *G08G 5/0034* (2013.01); *G08G 5/0069* (2013.01); *G01C 23/00* (2013.01); *G05D 1/00* (2013.01); *G05D 1/042* (2013.01); *G05D 1/0607* (2013.01); *G05D 1/0808* (2013.01); *G08G 5/0013* (2013.01)

(56) References Cited

U.S. PATENT DOCUMENTS

| | | |
|---|---|---|
| 2009/0063032 A1 | 3/2009 | Das |
| 2015/0006078 A1* | 1/2015 | Dorfmann .............. G01C 21/00 701/533 |
| 2016/0180718 A1 | 6/2016 | Shapiro et al. |

OTHER PUBLICATIONS

Decision to Grant issued in corresponding Japanese Patent Applcation No. JP 2016-139964, dated Jun. 26, 2018.

\* cited by examiner

FLIGHT PATH SETTING APPARATUS, FLIGHT PATH SETTING METHOD, AND COMPUTER READABLE MEDIUM

CROSS-REFERENCE TO RELATED APPLICATIONS

The present application claims priority from Japanese Patent Application No. 2016-139964 filed on Jul. 15, 2016, the entire contents of which are hereby incorporated by reference.

BACKGROUND

The technology relates to a flight path setting apparatus, a flight path setting method, and a computer readable medium having a flight path setting program each of which sets a flight path of an aircraft.

A technique of setting a flight path of an aircraft that involves disposing of waypoints to be passed by the aircraft has been known, for example, as disclosed in Japanese Patent No. 3557445.

SUMMARY

It has not been easy to appropriately set respective waypoints by the foregoing technique of setting a path.

It is desirable to provide a flight path setting apparatus, a flight path setting method, and a computer readable medium having a flight path setting program that each achieve setting of a flight path by disposing points on the flight path in a simple manner.

An aspect of the technology provides a flight path setting apparatus that includes a display unit, a selector, a range calculator, and a display controller. The display unit displays a flight path of an aircraft. The flight path includes a plurality of points. The selector selects a first point on the basis of an operation performed by a user. The first point is any one of the points displayed by the display unit. The range calculator calculates a non-settable range on the basis of a flight performance of the aircraft and a surrounding environment of the aircraft. The non-settable range is a region that is around the first point and in which a second point is not settable. The second point is subsequent to the first point on the flight path. The display controller causes the display unit to display the non-settable range that relates to the first point and is calculated by the range calculator.

The flight path setting apparatus may further include a mover and a location adjuster. The mover may move the first point on the basis of an operation performed by the user. The location adjuster may move the second point to a location when the first point is moved by the mover and when the second point is disposed inside the non-settable range that relates to the first point and is calculated by the range calculator. The location may be on a boundary of the non-settable range and have a shortest distance from a third point subsequent to the second point. The third point may be subsequent to the second point on the flight path.

The flight path setting apparatus may further include a storage. The storage may store flight performances of a plurality of aircraft types. The range calculator may calculate the non-settable range by reading, from the storage, the flight performance of one of the aircraft types that corresponds to the aircraft.

The display unit may be a display provided integrally with a touch panel that receives a touch operation performed by the user.

An aspect of the technology provides a flight path setting method including: causing a display unit to display a flight path of an aircraft, the flight path including a plurality of points; selecting a first point on the basis of an input operation, the first point being any one of the points displayed by the display unit; calculating a non-settable range on the basis of a flight performance of the aircraft and a surrounding environment of the aircraft, the non-settable range being a region that is around the first point and in which a second point is not settable, the second point being subsequent to the first point on the flight path; and causing the display unit to display the calculated non-settable range that relates to the first point.

An aspect of the technology provides a non-transitory computer readable medium having a flight path setting program, the flight path setting program causing, when executed by a computer, the computer to implement a method, the method including: causing a display unit to display a flight path of an aircraft, the flight path including a plurality of points; selecting a first point on the basis of an input operation, the first point being any one of the points displayed by the display unit; calculating a non-settable range on the basis of a flight performance of the aircraft and a surrounding environment of the aircraft, the non-settable range being a region that is around the first point and in which a second point is not settable, the second point being subsequent to the first point on the flight path; and causing the display unit to display the calculated non-settable range that relates to the first point.

An aspect of the technology provides a flight path setting apparatus that includes a display and circuitry. The display displays a flight path of an aircraft. The flight path includes a plurality of points. The circuitry selects a first point on the basis of an operation performed by a user. The first point is any one of the points displayed by the display unit. The circuitry calculates a non-settable range on the basis of a flight performance of the aircraft and a surrounding environment of the aircraft. The non-settable range is a region that is around the first point and in which a second point is not settable. The second point is subsequent to the first point on the flight path. The circuitry causes the display to display the calculated non-settable range that relates to the first point.

DETAILED DESCRIPTION

In the following, a description is given of one implementation of the technology with reference to the accompanying drawings. The implementation is directed, without limitation, to an example in which a flight path setting apparatus according to an implementation of the technology is applied to an unmanned aircraft operating terminal.

[Configuration of Unmanned Aircraft Operating Terminal]

First, a description is given of a configuration of an unmanned aircraft operating terminal 1 according to one implementation of the technology.

Figure 1:
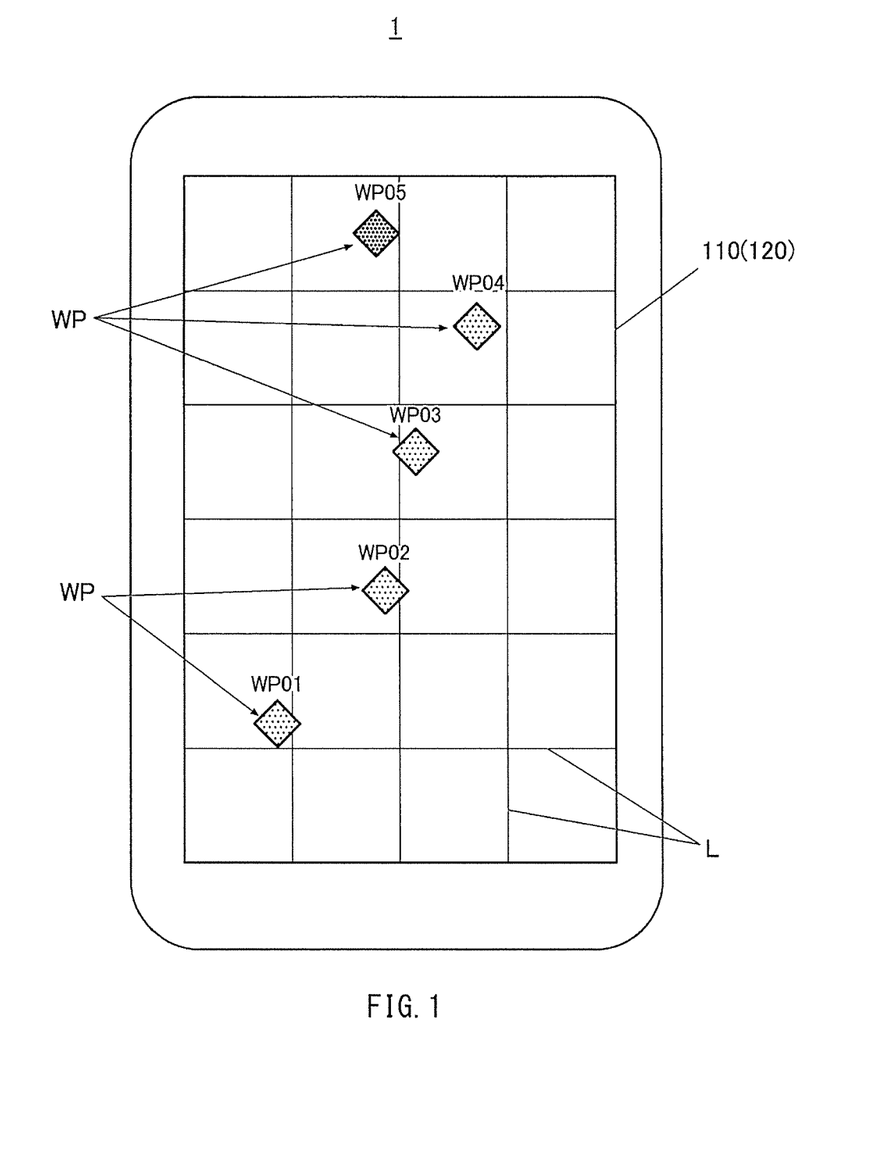
FIG. 1 illustrates an example of an appearance of an unmanned aircraft operating terminal according to an implementation of the technology.
Figure 2:
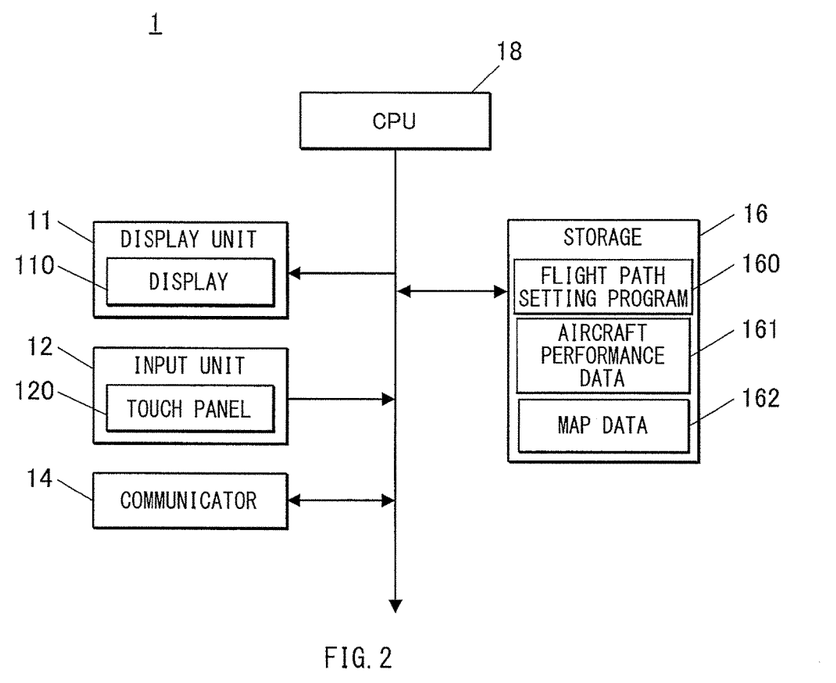
FIG. 2 is a block diagram illustrating an example of a functional configuration of the unmanned aircraft operating terminal according to the implementation of the technology.

FIG. 1 illustrates an example of an appearance of the unmanned aircraft operating terminal 1. FIG. 2 is a block diagram illustrating an example of a functional configuration of the unmanned aircraft operating terminal 1.

The unmanned aircraft operating terminal 1 may allow for an operation of an unmanned aircraft 30 which will be described later. The unmanned aircraft may be an unmanned aerial vehicle (UAV). In the present implementation, the unmanned aircraft operating terminal 1 may allow for setting of a flight path, of the unmanned aircraft 30, that includes a plurality of points.

Referring to FIG. 1, the unmanned aircraft operating terminal 1 may be a tablet personal digital assistant, and include a display 110.

The display 110 may be a display screen that is disposed at the front of the unmanned aircraft operating terminal 1. The display 110 may display various pieces of data that are based on an operation performed by a user. Non-limiting examples of the data may include characters and signs. The display 110 may be a liquid crystal display (LCD), an electroluminescence display (ELD), or any other suitable device having a display function.

The display 110 may also be provided integrally with a so-called touch panel 120 illustrated in FIG. 2, whereby the display 110 may be able to receive a touch operation performed by the user.

Referring specifically to FIG. 2, the unmanned aircraft operating terminal 1 may include a display unit 11, an input unit 12, a communicator 14, a storage 16, and a central processing unit (CPU) 18. These units may be coupled to one another through a bus to allow for a data communication mutually. In one implementation, the CPU 18 may serve as a "selector", a "range calculator", a "display controller", a "mover" and a "location adjuster".

The display unit 11 may include the display 110. The display unit 11 may display various pieces of information on the display 110, on the basis of a display signal received from the CPU 18.

The input unit 12 may include the touch panel 120, and may output, to the CPU 18, a signal corresponding to the touch operation performed on the touch panel 120. For example, the input unit 120 may output the signal corresponding to a position, or any other factor, on the touch panel 120 on which the touch operation is performed.

The communicator 14 may allow for connection to a communication network by means of a wireless communication. The communicator 14 may also perform a communication with the unmanned aircraft 30 to allow for transmission and reception of various signals mutually.

The storage 16 may be a memory that stores a program, data, etc. used to achieve various functions of the unmanned aircraft operating terminal 1, and serves as a workspace of the CPU 18. The storage 16 according to the present implementation may store a flight path setting program 160 that causes the CPU 18 to execute a flight path setting process which will be described later.

The storage 16 may also store aircraft performance data 161 and map data 162.

The aircraft performance data 161 may relate to flight performances of a plurality of aircraft types including an aircraft type corresponding to the unmanned aircraft 30. Non-limiting examples of the flight performances may include a speed performance, a turning performance, and an elevating performance.

The map data 162 may include comprehensive geographic information including terrain information and information on a utilization state of the land. Examples of the terrain information may include information on a mountain and a river. Examples of the information on the utilization state of the land may include information on a road, a railway, a building, and a farmland.

The CPU 18 may control the unmanned aircraft operating terminal 1 on an across-the-board basis, by executing a process based on a predetermined program in accordance with an inputted instruction and performing an operation such as issuance of instructions to respective functional units and a transfer of pieces of data to the respective functional units. More specifically, the CPU 18 may read out various programs stored in the storage 16 on the basis of a signal such as the operation signal received from the input unit 12, and execute a process in accordance with the read-out programs. The CPU 18 may further temporarily hold a result of the process in the storage 16, and output the result of the process to the display unit 11 on an as-needed basis.

[Configuration of Unmanned Aircraft]

A description is given below of a configuration of the unmanned aircraft (the UAV) 30 for which a flight path is set by the unmanned aircraft operating terminal 1.

Figure 3:
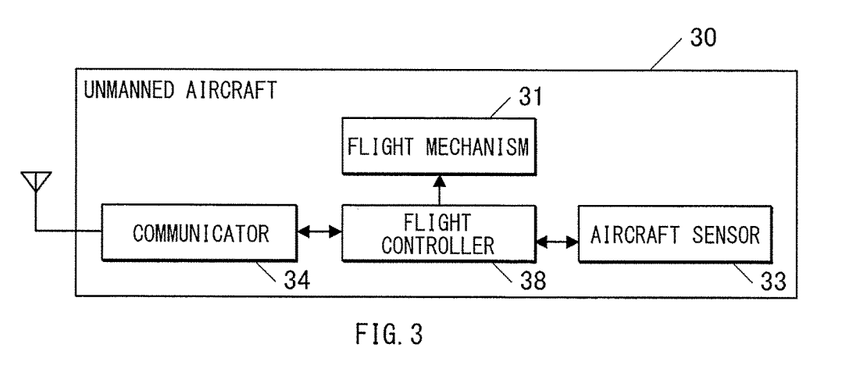
FIG. 3 is a block diagram illustrating an example of an outline configuration of an unmanned aircraft according to the implementation of the technology.

FIG. 3 is a block diagram illustrating an example of an outline configuration of the unmanned aircraft 30.

A flight control of the unmanned aircraft 30 may be performed by means of control instructions given from the unmanned aircraft operating terminal 1. Specifically, referring to FIG. 3, the unmanned aircraft 30 may include a flight mechanism 31, an aircraft sensor 33, a communicator 34, and a flight controller 38. The flight mechanism 31 may allow for the flight of the unmanned aircraft 30.

The aircraft sensor 33 may include various sensors directed to detection of a flight state of the unmanned aircraft 30 and acquisition of information on a surrounding situation of the unmanned aircraft 30. Non-limiting examples of the various sensors may include a gyroscope, a velocity sensor, and a global positioning system (GPS), and an altitude sensor. The aircraft sensor 33 may acquire various pieces of information on the basis of control instructions given from the flight controller 38.

The communicator 34 may perform a wireless communication with the unmanned aircraft operating terminal 1, a control facility, or both to allow for transmission and reception of various signals mutually. The control facility may be located at any location, such as on the ground, at the sea, and in the air.

The flight controller 38 may perform a drive control of the flight mechanism 31 to control the flight of the unmanned aircraft 30. The flight controller 38 may also perform the transmission and the reception of the various signals through the communicator 34 to centrally control each part of the unmanned aircraft 30.

[Operation of Unmanned Aircraft Operating Terminal]

A description is given below of an operation of the unmanned aircraft operating terminal 1 that is performed upon execution of the flight path setting process. FIGS. 4A to 5B describe examples of the flight path setting process.

In one implementation, the flight path setting process may set a flight path of the unmanned aircraft 30 by disposing waypoints WP. The flight path setting process may involve initial setting of the flight path before takeoff of the unmanned aircraft 30 and making a change in the flight path during the flight of the unmanned aircraft 30. The flight path setting process may be executed upon input of an execution instruction of the flight path setting process by a user (an operator) of the unmanned aircraft operating terminal 1. Upon the input of the execution instruction of the flight path setting process, the CPU 18 may read and load the flight path setting program 160 from the storage 16 and thereby execute the flight path setting process.

Referring to FIG. 1, five waypoints WP may be disposed in advance in this example. The five waypoints WP may include waypoints WP01 to WP05 which may be collectively referred to as the "waypoint WP" hereinafter. A description is given below of an example case in which the flight path is to be changed by moving the waypoints WP.

Upon the execution of the flight path setting process, the CPU 18 may first cause the flight path, of the unmanned aircraft 30, including the five waypoints WP to be displayed on the display 110 as illustrated in FIG. 1.

Specifically, the display 110 may display the flight path on a horizontal plane. The horizontal plane displayed on the display 110 in plan view may be defined in a grid pattern by a plurality of grid lines L. The grid lines L may extend in a west-east direction and a north-south direction, and may be provided at predetermined intervals. The waypoint WP05 as the final point of the five waypoints WP may be so displayed that distinction between the waypoint WP05 and other waypoints, i.e., the waypoints WP01 to WP04 is possible upon displaying of the flight path. Specifically, for example, the waypoint WP05 may be displayed in a color, a pattern, or both different from those of the waypoints WP01 to WP04 to allow for the distinction. Further, the altitude of each of the waypoints WP may be displayed by means of a numerical value. Further, in a case where the unmanned aircraft 30 is currently flying along the flight path, an icon representing the unmanned aircraft 30 may be displayed at a location at which the unmanned aircraft 30 is currently flying.

Thereafter, the CPU 18 may select any one waypoint WP to be moved out of the five waypoints WP, on the basis of an operation performed by the user.

In the present implementation, the waypoint WP02 may be selected out of the five waypoints WP on the basis of the touch operation performed by the user on the display 110, specifically, on the touch panel 120.

Figure 4A:
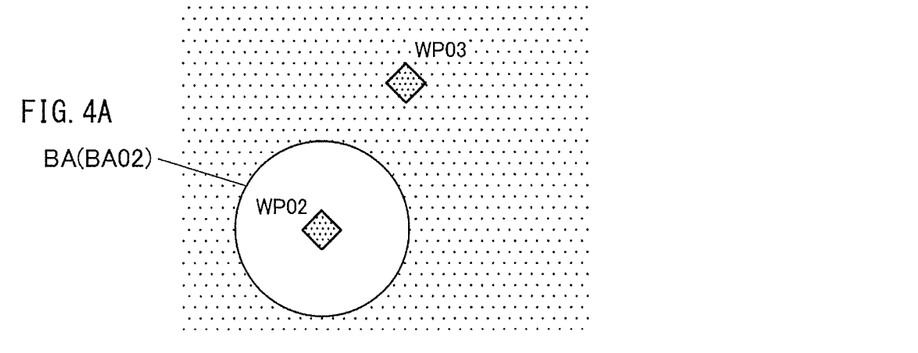
FIGS. 4A to 4C describe an example a process of setting a flight path according to the implementation of the technology.
Figure 4B:
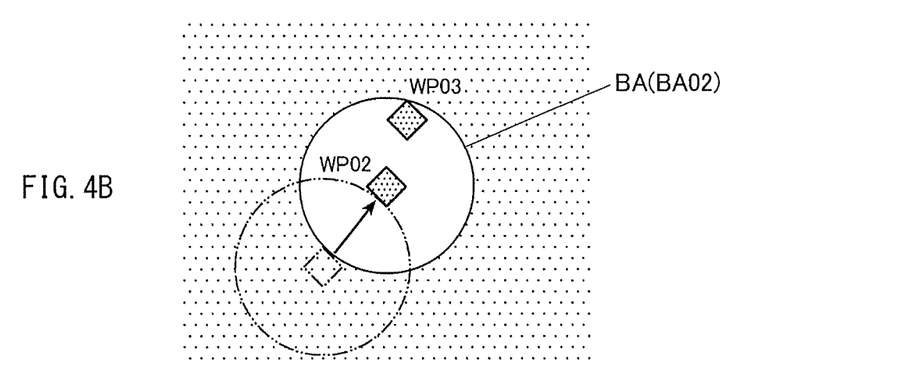
Figure 4C:
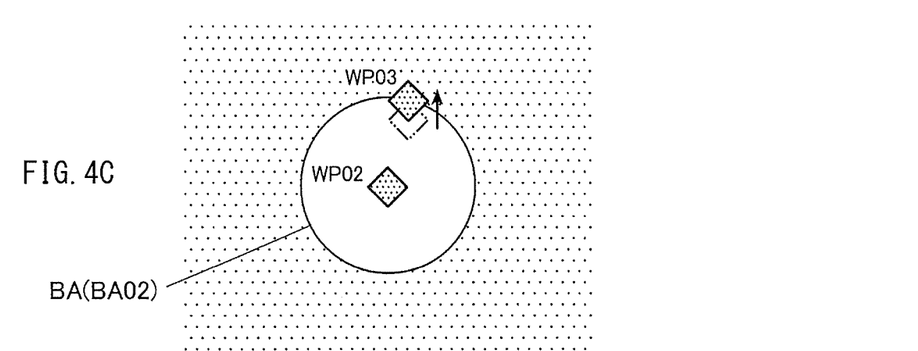

Thereafter, the CPU 18 may calculate a non-settable range BA illustrated in FIGS. 4A to 4C, etc. on the basis of the flight performance of the unmanned aircraft 30 and the surrounding environment of the unmanned aircraft 30. The non-settable range BA may be a region that is around the selected waypoint WP02 and in which the waypoint WP subsequent to the selected waypoint WP02, i.e., the waypoint WP03 is not settable. Non-limiting examples of the flight performance of the unmanned aircraft 30 may include a speed performance, a turning performance, and an elevating performance of the unmanned aircraft 30. Non-limiting examples of the surrounding environment of the unmanned aircraft 30 may include presence of another aircraft and the terrain.

More specifically, the non-settable range BA may be a region that is difficult for the unmanned aircraft 30 to pass subsequently to the selected waypoint WP due to limitation in factors such as the flight performance and the surrounding environment of the unmanned aircraft 30, when the unmanned aircraft 30 travels along the flight path and passes the selected waypoint WP. The foregoing selected waypoint WP may be the waypoint WP02 in the present implementation. The CPU 18 may read, from the aircraft performance data 161, the flight performance of the aircraft type corresponding to the unmanned aircraft 30, and acquire information on the surrounding environment of the unmanned aircraft 30 from the map data 162 and from a device such as the aircraft sensor 33 of the unmanned aircraft 30, for example. The CPU 18 may calculate the non-settable range BA as a three-dimensional range on the basis of the read flight performance and the read surrounding environment.

It is to be noted that the non-settable ranges BA relating to the respective waypoints WP may be hereinafter differentiated from each other by means of the numerals attached to the end of the numbers of the respective waypoints WP. For example, the non-settable range BA relating to the waypoint WP02 may be referred to as a "non-settable range BA02".

Thereafter, referring to FIG. 4A, the CPU 18 may cause the calculated non-settable range BA02 relating to the waypoint WP02 to be displayed on the display 110.

This allows the user to promptly recognize a region in which the waypoint WP03 subsequent to the waypoint WP02 is not settable. It is therefore possible to favorably dispose the waypoint WP03 taking into consideration the factors such as the flight performance and the surrounding environment of the unmanned aircraft 30 simply by selecting a location outside the non-settable range BA02 upon disposing the waypoint WP03.

It is to be noted that FIGS. 4A to 5B each illustrate the non-settable range BA on the horizontal plane by means of a circle as an example; however, a shape of the non-settable range BA is not particularly limited. FIGS. 4A to 5B are provided especially for illustration purpose of the non-settable range BA, and are not necessarily an illustration of the display screen of the display 110.

Thereafter, referring to FIG. 4B, the CPU 18 may move the selected waypoint WP02 on the basis of an operation performed by the user.

In one implementation, the CPU 18 may horizontally move the waypoint WP02 on the display 110 in response to a drag operation performed by the user when the CPU 18 receives the drag operation performed by the user.

Upon moving the waypoint WP02, the CPU 18 may move the non-settable range BA02 relating to the waypoint WP02 on the display 110 together with the waypoint WP02. Upon moving the non-settable range BA02, when the non-settable range BA02 may be possibly changed in accordance with the movement of the waypoint WP02, the CPU 18 may calculate again the non-settable range BA02 relating to the moved waypoint WP02 and update, on an as-necessary basis, the displayed content on the display 110.

Thereafter, the CPU 18 may determine whether the waypoint WP03 is present inside the non-settable range BA02 relating to the moved waypoint WP02. When the CPU 18 determines that the waypoint WP03 is not present inside the non-settable range BA02 relating to the moved waypoint WP02, the CPU 18 may maintain the location of the waypoint WP03 as it is, and update the flight path. Further, the CPU 18 may cause the communicator 14 to transmit, to the unmanned aircraft 30, a control signal that moves the waypoint WP02 on the actual flight path to a location on the actual flight path corresponding to the location of the moved waypoint WP02 on the display 110. The CPU 18 may thereby change the actual flight path of the unmanned aircraft 30.

Referring to FIG. 4C, when the CPU 18 determines that the waypoint WP03 is present inside the non-settable range BA02 relating to the moved waypoint WP02, the CPU 18 may move the waypoint WP03 from the inside of the non-settable range BA02 relating to the waypoint WP02.

Figure 5A:
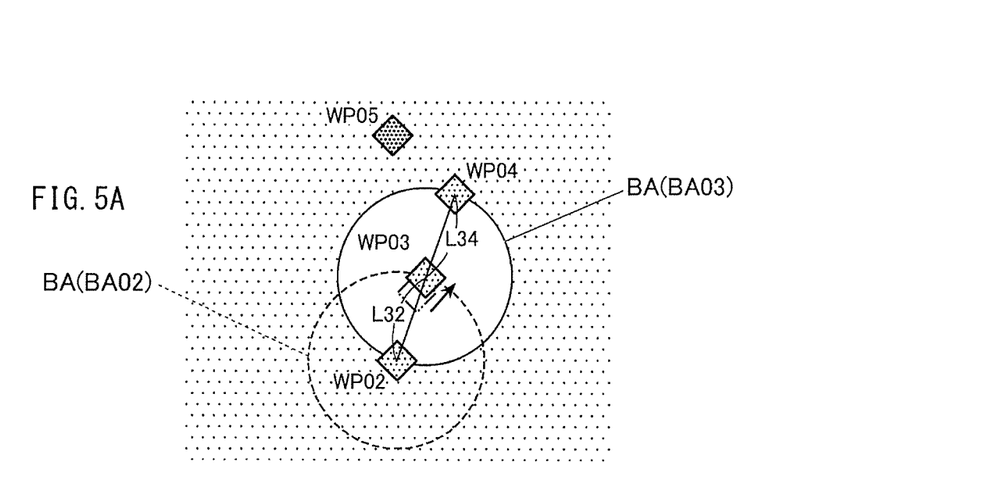
FIGS. 5A and 5B describe an example of the process of setting the flight path according to the implementation of the technology.

Specifically, referring to FIG. 5A, upon moving the waypoint WP03 from the inside of the non-settable range BA02, the CPU 18 may move the waypoint WP03 on the display 110 to a location that is on a boundary of the non-settable range BA02 relating to the waypoint WP02, and has the shortest distance L34 from the waypoint WP04. The location that is on the boundary of the non-settable range BA02 relating to the waypoint WP02 may have the shortest distance L32 from the waypoint WP02.

Thereafter, the CPU 18 may calculate a non-settable range BA03 relating to the waypoint WP03 in a manner similar to the foregoing manner in which the non-settable range BA02 relating to the waypoint WP02 is calculated. Further, the CPU 18 may determine whether the waypoint WP04 is present inside the calculated non-settable range BA03 in a manner similar to the manner in which whether the waypoint WP03 is present inside the non-settable range BA02 is determined.

When the CPU 18 determines that the waypoint WP04 is not present inside the non-settable range BA03 relating to the waypoint WP03, the CPU 18 may maintain the location of the waypoint WP04 as it is, and update the flight path. The CPU 18 may cause the communicator 14 to transmit, to the unmanned aircraft 30, a control signal that moves the waypoints WP02 and WP03 on the actual flight path to respective locations on the actual flight path corresponding to the locations of the moved waypoint WP02 and the moved waypoint WP03 on the display 110. The CPU 18 may thereby change the actual flight path of the unmanned aircraft 30.

When the CPU 18 determines that the waypoint WP04 is present inside the non-settable range BA03 relating to the waypoint WP03, the CPU 18 may adjust the location of the waypoint WP04 in a manner similar to the manner in which the location of the waypoint WP03 is adjusted as described above. Specifically, referring to FIG. 5B, the CPU 18 may move the waypoint WP04 on the display 110 to a location that is on a boundary of the non-settable range BA03 relating to the waypoint WP03, and has the shortest distance L45 from the waypoint WP05. The location that is on the boundary of the non-settable range BA03 relating to the waypoint WP03 may be a location having the shortest distance L43 from the waypoint WP03. In the case of moving the waypoint WP04 to the foregoing location, the waypoint WP04 may be located at a location on a straight light connecting the waypoint WP03 and the waypoint WP05, for example, unless the waypoint WP03 is brought closer to the waypoint WP05 than the WP04 as a result of the movement of the waypoint WP03.

Figure 5B:
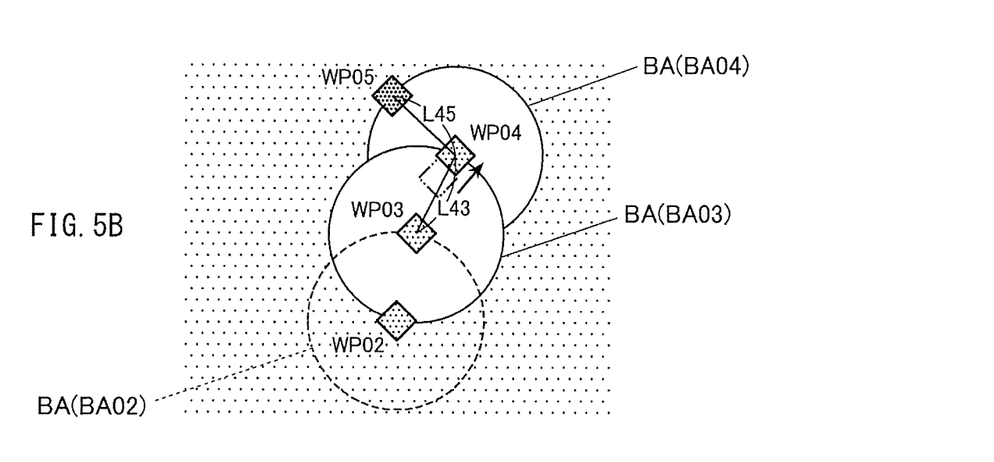

Thereafter, the CPU 18 may calculate a non-settable range BA04 relating to the waypoint WP04 in a manner similar to the foregoing manner in which the non-settable range BA02 relating to the waypoint WP02 is calculated. Further, the CPU 18 may determine whether the waypoint WP05 is present inside the calculated non-settable range BA04 in a manner similar to the manner in which whether the waypoints WP03 and WP04 are present inside the respective non-settable ranges BA02 and BA03 is determined. In the present implementation, the waypoint WP05 may not be located inside the non-settable range BA04 relating to the waypoint WP04. The location of the waypoint WP05 may be therefore maintained as it is. Thereafter, the CPU 18 may cause the communicator 14 to transmit, to the unmanned aircraft 30, a control signal that moves the waypoints WP02 to WP04 on the actual flight path to respective locations on the actual flight path corresponding to the locations of the moved waypoints WP02 to WP04 on the display 110. The CPU 18 may thereby change the actual flight path of the unmanned aircraft 30.

The CPU 18 may thus sequentially adjust the locations of the respective waypoints WP on an as-needed basis in order of the locations on the flight path, in accordance with the movement of the waypoint WP performed by the user. The CPU 18 may so perform the foregoing adjustment that the waypoint WP subsequent to the moved waypoint WP is not located inside the non-settable range BA of the moved waypoint WP. Further, upon the adjustment of the location of the waypoint WP subsequent to the moved waypoint, the waypoint WP subsequent to the moved waypoint WP may be located at a location that is on a shortest path connecting the waypoints that are previous and subsequent to the waypoint WP subsequent to the moved waypoint WP.

[Example Effects]

According to the foregoing implementation, when one of the five waypoints WP displayed on the display 110 is selected by the user, the non-settable range BA may be calculated on the basis of the flight performance and the surrounding environment of the unmanned aircraft 30, and the calculated non-settable range BA may be displayed on the display 110. The selected waypoint WP may be hereinafter referred to as a "first waypoint WP". The non-settable range BA may be a region that is around the first waypoint WP and in which the waypoint WP subsequent to the first waypoint WP is not settable. The waypoint WP subsequent to the first waypoint WP may be hereinafter referred to as a "second waypoint WP".

This allows the user to promptly recognize the region in which the second waypoint WP is not settable, and to favorably dispose the second waypoint WP. As a result, it is possible to set the flight path by disposing the waypoints WP in a simpler manner compared with the existing technique which requires a person who sets the path to take into consideration factors such as the flight performance of the aircraft and the surrounding environment.

Moreover, upon the movement, by the user, of the first waypoint WP, when the second waypoint WP is disposed inside the non-settable range BA relating to the first waypoint WP, the second waypoint WP may be moved to the following location. That is, the second waypoint WP may be moved to the location that is on the boundary of the non-settable range BA relating to the first waypoint WP and has the shortest distance from a waypoint subsequent to the second waypoint WP. The waypoint that is subsequent to the second waypoint WP may be hereinafter referred to as a "third waypoint WP". The first to third waypoints WP may correspond to the waypoints WP02 to WP04, respectively, in the foregoing implementation.

The location of the second waypoint WP may be influenced by the movement of the first waypoint WP. However, such a location of the second waypoint WP may be adjusted automatically in accordance with the operation of moving the first waypoint WP performed by the user. As a result, it is possible to set the flight path by disposing the waypoints WP in a simpler manner.

Moreover, the flight performance of the aircraft corresponding to the unmanned aircraft 30 for which the path is to be set may be read from the aircraft performance data 161 stored in the storage 16 that stores the flight performances of the plurality of aircraft types. The non-settable range BA may be calculated on the basis of the read flight performance.

This makes it possible to determine the non-settable range BA appropriately taking into consideration the flight performance that differs between aircrafts.

Moreover, the display 110 may be provided integrally with the touch panel 120. This allows the user to perform a touch operation with respect to the display 110. It is therefore possible to set the flight path by disposing the waypoints WP in a further simpler manner.

[Modifications]

It is to be noted that the technology is not limitedly applicable to the foregoing implementations. It should be appreciated that modifications and alterations may be made by persons skilled in the art without departing from the scope as defined by the appended claims or the equivalents thereof.

For example, the foregoing implementation refers to an example case in which the non-settable range BA02 relating to the waypoint WP02 on which the operation is performed by the user is displayed on the display 110; however, this is non-limiting. Alternatively, in another implementation, the non-settable ranges BA relating to other waypoints WP on which no operation is performed by the user may be displayed on the display 110 together with the non-settable range BA02.

For example, the foregoing implementation refers to an example case in which each of the locations of the waypoints WP subsequently provided to the moved waypoints WP is so adjusted as to be located on the shortest path connecting the previous waypoint and the subsequent waypoint of the waypoint WP the location of which is under adjustment; however, this is non-limiting. Alternatively, in another implementation, the adjustment of the location may be so performed as to achieve a path that is optimal in terms of fuel consumption, unless factors such as a velocity of the aircraft at the relevant waypoint WP and time to pass the relevant waypoint WP are not specified.

For example, the foregoing implementation refers to an example case in which the waypoint WP is moved horizontally; however, this is non-limiting. The technology is similarly applicable to a case in which the waypoint WP is to be moved vertically, i.e., a case in which the altitude of the waypoint WP is to be changed. It is to be noted that, in the case of vertically moving the waypoint WP, it may be preferable, for example, to display the altitude of the flight by means of numerical values, or to three-dimensionally display the flight path. The touch operation to be performed on the touch panel may be performed in the following example ways. That is, for example, the altitude may be decreased by a stretch operation, i.e., a "pinch out" operation, and may be increased by a pinch operation, i.e., a "pinch in" operation.

According to one implementation of the technology, the target for which the path is to be set is not limited to the unmanned aircraft, and may be any aircraft.

The flight path setting apparatus of the technology is not limited to the tablet.

According to one implementation of the technology, when the first point is selected, by the user, out of the points displayed by the display unit, the non-settable range is calculated on the basis of the flight performance of the aircraft and the surrounding environment of the aircraft, and the calculated non-settable range is displayed on the display unit. The non-settable range is the region that is around the first point and in which the second point subsequent to the first point on the flight path is not settable.

This allows the user to promptly recognize the region in which the second point is not settable, and to favorably dispose the second point. As a result, it is possible to set the flight path by disposing the points in a simpler manner compared with the existing technique which requires a person who sets the path to take into consideration factors such as the flight performance of the aircraft and the surrounding environment.

According to one implementation of the technology, the second point may be moved to the following location when the first point is moved by the user and when the second point is disposed inside the non-settable range that relates to the first point. The location may be on a boundary of the non-settable range and have a shortest distance from a third point subsequent to the second point. The third point may be subsequent to the second point.

The location of the second point may be influenced by the movement of the moved first point. However, such a location of the second point may be adjusted automatically in accordance with the operation of moving the first point. As a result, it is possible to set the flight path by disposing the points in a simpler manner.

According to one implementation of the technology, the non-settable range may be set by reading, from the storage, the flight performance of one, of the aircraft types, that corresponds to the aircraft for which the path is to be set. The storage may store the plurality of aircraft types.

This makes it possible to calculate the non-settable range appropriately taking into consideration the flight performance that differs between aircrafts.

According to one implementation of the technology, the display unit may be the display that is provided integrally with the touch panel.

This allows the user to perform a touch operation with respect to the display. It is therefore possible to set the flight path by disposing the points in a further simpler manner.

In one implementation described above, the CPU 18 may alternatively be a semiconductor integrated circuit that may have devices such as, but not limited to, a central processing unit (CPU), ROM, and RAM. In another implementation, the CPU 18 may alternatively be an integrated circuit such as, but not limited to, a field programmable gate array (FPGA) and an application specific integrated circuit (ASIC).

The implementation also provides a program as the flight path setting program 160 that causes a computer or a circuitry to function as the CPU 18, and a recording medium that stores the program. The recording medium is computer readable or circuitry readable. Non-limiting examples of the recording medium may include a flexible disk, a magneto-optical disk, ROM, CD, DVD (Registered Trademark), and BD (Registered Trademark). As used herein, the term "program" may refer to a data processor written in any language and any description method.

The invention claimed is:

1. A flight path setting apparatus comprising:
   a display unit that displays a flight path of an aircraft, the flight path including a plurality of points;
   a selector that selects a first point on a basis of an operation performed by a user, the first point being any one of the plurality of points displayed by the display unit;
   a range calculator that calculates a non-settable range on a basis of a flight performance of the aircraft and a surrounding environment of the aircraft, the non-settable range being a region that is around the first point and in which a second point is not settable, the second point being subsequent to the first point on the flight path;

a display controller that causes the display unit to display the non-settable range that relates to the first point and is calculated by the range calculator;

a mover that moves the first point on a basis of an operation performed by the user; and a location adjuster that moves the second point to a location when the first point is moved by the mover and when the second point is disposed inside the non-settable range that relates to the first point and is calculated by the range calculator, the location being on a boundary of the non-settable range and having a shortest distance from a third point subsequent to the second point, the third point being subsequent to the second point on the flight path.

2. The flight path setting apparatus according to claim 1, further comprising a storage that stores flight performances of a plurality of aircraft types, wherein the range calculator calculates the non-settable range by reading, from the storage, the flight performance of one of the aircraft types that corresponds to the aircraft.

3. The flight path setting apparatus according to claim 1, wherein the display unit is a display provided integrally with a touch panel that receives a touch operation performed by the user.

4. The flight path setting apparatus according to claim 2, wherein the display unit is a display provided integrally with a touch panel that receives a touch operation performed by the user.

5. A flight path setting method comprising:

causing a display unit to display a flight path of an aircraft, the flight path including a plurality of points;

selecting a first point on a basis of an input operation, the first point being any one of the plurality of points displayed by the display unit;

calculating a non-settable range on a basis of a flight performance of the aircraft and a surrounding environment of the aircraft, the non-settable range being a region that is around the first point and in which a second point is not settable, the second point being subsequent to the first point on the flight path;

causing the display unit to display the calculated non-settable range that relates to the first point;

moving the first point on a basis of an operation performed by the user; and moving the second point to a location when the first point is moved by a mover and when the second point is disposed inside the non-settable range that relates to the first point and is calculated by a range calculator, the location being on a boundary of the non-settable range and having a shortest distance from a third point subsequent to the second point, the third point being subsequent to the second point on the flight path.

6. A non-transitory computer readable medium having a flight path setting program, the flight path setting program causing, when executed by a computer, the computer to implement a method, the method comprising:

causing a display unit to display a flight path of an aircraft, the flight path including a plurality of points;

selecting a first point on a basis of an input operation, the first point being any one of the plurality of points displayed by the display unit;

calculating a non-settable range on a basis of a flight performance of the aircraft and a surrounding environment of the aircraft, the non-settable range being a region that is around the first point and in which a second point is not settable, the second point being subsequent to the first point on the flight path;

causing the display unit to display the calculated non-settable range that relates to the first point;

moving the first point on a basis of an operation performed by the user; and moving the second point to a location when the first point is moved by a mover and when the second point is disposed inside the non-settable range that relates to the first point and is calculated by a range calculator, the location being on a boundary of the non-settable range and having a shortest distance from a third point subsequent to the second point, the third point being subsequent to the second point on the flight path.

7. A flight path setting apparatus comprising:

a display that displays a flight path of an aircraft, the flight path including a plurality of points; and circuitry configured to select a first point on a basis of an operation performed by a user, the first point being any one of the plurality of points displayed by the display unit, calculate a non-settable range on a basis of a flight performance of the aircraft and a surrounding environment of the aircraft, the non-settable range being a region that is around the first point and in which a second point is not settable, the second point being subsequent to the first point on the flight path, cause the display to display the calculated non-settable range that relates to the first point;

move the first point on a basis of an operation performed by the user; and move the second point to a location when the first point is moved by a mover and when the second point is disposed inside the non-settable range that relates to the first point and is calculated by a range calculator, the location being on a boundary of the non-settable range and having a shortest distance from a third point subsequent to the second point, the third point being subsequent to the second point on the flight path.

* * * * *